United States Patent [19]

Stark

[11] 4,248,453
[45] Feb. 3, 1981

[54] PORTABLE LUGGAGE CARRIER

[76] Inventor: Ted Stark, 60 Eagle Rock Way, Montclair, N.J. 07042

[21] Appl. No.: 969,372

[22] Filed: Dec. 14, 1978

[51] Int. Cl.³ .............................................. B62B 3/02
[52] U.S. Cl. ................................ 280/655; 16/18 R; 280/47.37 R; 280/47.17; 301/63 PW
[58] Field of Search ................ 280/652, 655, 47.37 R, 280/47.37 C, 47.37 L, 47.17, 47.27, 47.2; 301/63 PW, 63 DT; 16/18 R, 45

[56] References Cited

U.S. PATENT DOCUMENTS

| 1,197,190 | 9/1916 | Dunn | 280/47.35 |
|---|---|---|---|
| 1,718,962 | 7/1929 | Kimball | 280/655 |
| 2,546,876 | 3/1951 | Sutherland | 280/47.27 |
| 3,197,226 | 7/1965 | Erlinder | 280/646 |
| 3,360,300 | 12/1967 | Carter | 301/63 PW |
| 3,376,047 | 4/1968 | Schuster | 280/37 |
| 3,537,721 | 11/1970 | Warner, Jr. | 280/47.17 |
| 3,540,752 | 11/1970 | Anuskiewicz et al. | 280/47.37 |
| 3,589,149 | 6/1971 | Fischer | 301/63 PW |
| 3,612,563 | 10/1971 | Kazmark, Sr. | 280/655 |
| 3,998,476 | 7/1976 | Kazmark, Sr. | 280/655 |
| 4,037,858 | 7/1977 | Adams | 280/652 |
| 4,062,565 | 12/1977 | Holtz | 280/655 |
| 4,072,319 | 2/1978 | Berger | 280/47.37 R |
| 4,128,252 | 12/1978 | Raniero | 280/40 |

Primary Examiner—John J. Love
Assistant Examiner—Norman L. Stack
Attorney, Agent, or Firm—Hubbell, Cohen, Stiefel & Gross

[57] ABSTRACT

Accordingly, the present invention provides a collapsible carrier for transporting loads comprising a support member having two legs and an adjoining cross arm. A fold out platform device is pivotably connected to the support member for holding the loads. A telescoping handle apparatus is affixed to the support member for moving the carrier. A cylindrical wheel device having a wide slightly tapered rolling surface comprising a pair of cylindrical symmetrical surfaces upwardly tapering from a common contact point or edge is adjoined to the handle apparatus for minimizing the surface area of the wheel device contacting a travel surface along which the load is transported while increasing the stability of the carrier to facilitate the carrier rolling straight while decreasing the tendency of the carrier to laterally trip over under heavy load conditions as it is pulled along the travel surface. The angle of taper is sufficiently small to enable solely the common contact point to be in touch with the travel surface when the carrier is upright while enabling stable contact of the wider rolling tapered surface if the carrier starts to tip while being pulled.

13 Claims, 6 Drawing Figures

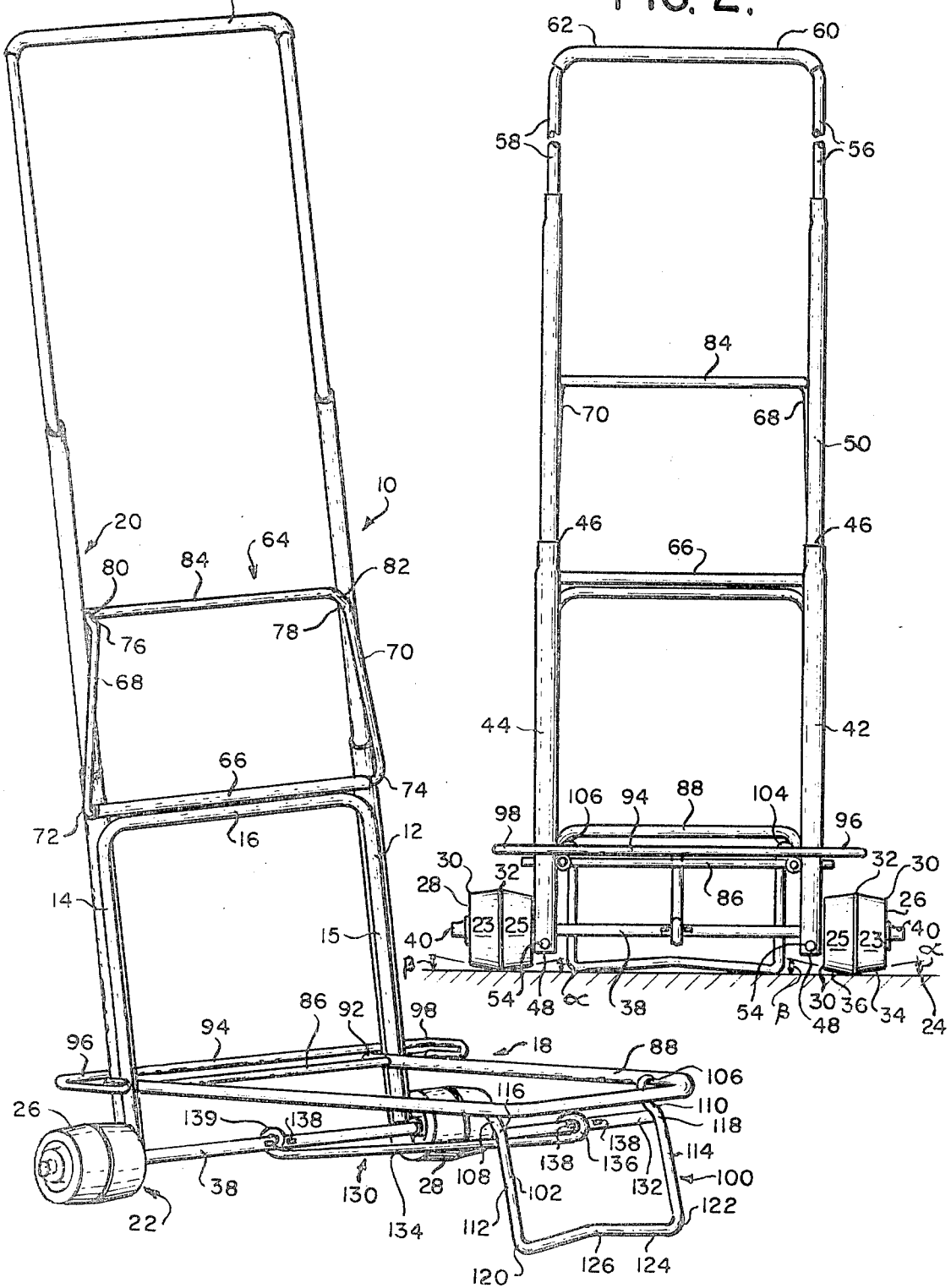

PORTABLE LUGGAGE CARRIER

BACKGROUND OF THE INVENTION

1. Field of the Invention

Although the present invention may be used in many different ways, it is particularly related to carriers for transporting loads and will be particularly described in that connection.

2. The Prior Art

In the past, a number of various types of collapsible carriers have been provided to move loads such as luggage, office supplies, or packages accumulated while shopping. In many cases, the carriers did not provide the sturdiness and stability required for heavy loads or uneven terrain. The prior art carriers often used narrow wheels which had a tendency to permit the carrier to tip over if the load was not properly balanced or if the carrier was not being moved along a relatively flat surface.

SUMMARY OF THE INVENTION

The present invention provides a collapsible carrier for transporting loads comprising a support member having two legs and an adjoining cross arm. A fold out platform device is pivotably connected to the support member for holding the loads. A telescoping handle apparatus is affixed to the support member for moving the carrier. A cylindrical wheel device having a wide slightly tapered rolling surface comprising a pair of cylindrical symmetrical surfaces upwardly tapering from a common contact point or edge is adjoined to the handle apparatus for minimizing the surface area of the wheel device contacting a travel surface along which the load is transported while increasing the stability of the carrier to facilitate the carrier rolling straight while decreasing the tendency of the carrier to laterally tip over under heavy load conditions as it is pulled along the travel surface. The angle of taper is sufficiently small to enable solely the common contact point to be in touch with the travel surface when the carrier is upright while enabling stable contact of the wider rolling tapered surface if the carrier starts to tip while being pulled.

BRIEF DESCRIPTION OF THE DRAWINGS

FIG. 1 is an illustration of a collapsible carrier in accordance with the present invention;

FIG. 2 is a rear view of the collapsible carrier of FIG. 1 in an upright position;

DESCRIPTION OF THE PREFERRED EMBODIMENTS

Figure 6:
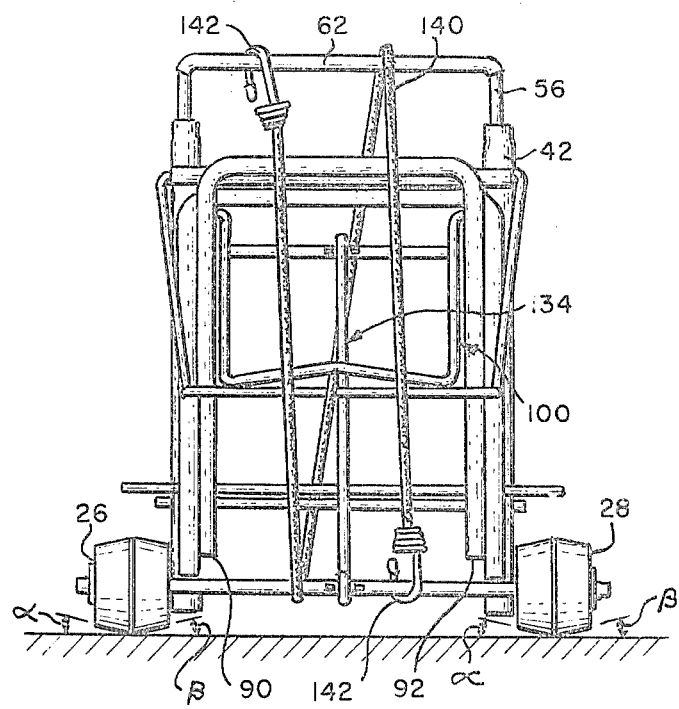
FIG. 6 is a front view of the collapsible carrier of FIG. 1 in a folded up position.

Referring to FIGS. 1 and 2 there is illustrated a collapsible carrier 10 for transporting loads comprising a support member 12 having two legs 14 and 15 and an adjoining cross arm 16. A fold out platform device 18 is pivotably connected to the support member 12 for holding the loads 11. A telescoping handle apparatus 20 is affixed to the support member 12 for moving the carrier 10. A cylindrical wheel device 22 having a wide slightly tapered rolling surface comprising a pair of cylindrical symmetrical surfaces 23, 25, similar to conical surfaces, which are upwardly tapering from a common contact point or edge 32 is adjoined to the handle apparatus 20 for minimizing the surface area of the wheel device contacting a travel surface 24 along which the load 11 is transported while increasing the stability of the carrier 10 to facilitate the carrier rolling straight while decreasing the tendency of the carrier to laterally tip over under heavy load conditions as it is pulled along the travel surface. As shown and preferred in FIGS. 2 and 6, the angle of taper $\alpha$, $\beta$ with respect to surface 24 is sufficiently small enough, such as between 10 and 15 degrees, to enable solely the common contact edge 32 to be in touch with the travel surface 24 when the carrier is upright enabling stable rolling contact of the wider rolling tapered surface 23 or 25 with surface 24 if the carrier starts to tip while being pulled, such as under heavy load conditions.

Referring to FIG. 2, there is illustrated the wheel device 22 which includes two such wheels 26, 28 being substantially identical and having two outer edges 30 of a first diameter. The narrow central section 32 is centrally disposed between the outer edges 30 and has a second diameter larger than the first diameter of the outer edges due to the aforementioned taper. This narrow central section 32 is the part of the wheel which generally contacts the travel surface 24 along which the load is transported. The width of this central section is minimal, such as, approximately 0.25 inches, although it may vary slightly if desired. The tapered cylindrical surfaces 23, 25 or stability sections are located between the central section 32 and the outer edges 30 and have a greater diameter than the first diameter and less than the second diameter of the central section 32 and, as previously mentioned, provide support for the carrier if it begins to laterally tip over. Preferably, these stability sections 23, 25 are slightly curved as illustrated in FIG. 2 to facilitate rolling friction. Although the wheels are preferably made of plastic, it is within the scope of the present invention to form them of any desirable material such as, for example, metal, wood, or rubber. The aforementioned wheel device 22 includes an axle 38 fixedly adjoined to the handle apparatus 20 by any conventional method such as, for example, welding. The axle 38 protrudes beyond the handle apparatus 20 and thereby provides a portion upon which the wheels 26, 28 may conventionally be slidingly and rotatably received thereon. Once the wheels 26, 28 are put onto the axle, end caps 40 are conventionally force fitted onto the axle 38 to keep the wheels 26 and 28 thereon, although any conventional means for retaining the wheels 26, 28 on the axle 38 may be employed.

The telescoping handle apparatus 20 includes two bottom hollow tubes 42 and 44 which are each affixed along the length of a different leg of the support member 12. In particular, hollow tube 42 is affixed to the leg 14 and hollow tube 44 is affixed to leg 15. The hollow tubes are substantially identical and each has an open top end 46 and an open bottom end 48. Each of the bottom hollow tubes 42 and 44 receives a telescoping tube 50 and 52, respectively, in their top ends 46. A stop member 54 is provided in the bottom end 48 to retain the telescoping tubes 50 and 52 within the bottom tubes. The stop member 54 may be a pin such as a rivet extending into the hollow portion of the bottom hollow tubes or any other device such as end caps for the hollow tubes. The telescoping tubes 50 and 52 each receive another telescoping tube 56 and 58 therein. The telescoping tubes 56 and 48 with the handle member 60 may be comprised of a single tube which is substantially U-shaped as illustrated. A plastic sleeve 62 may be provided along the handle member 60 to provide for a more comfortable grip of the handle member. It is further within the scope of the present invention to provide the handle grip of any desirable material such as, for example, leather, rubber, or cloth tape.

Figure 4:
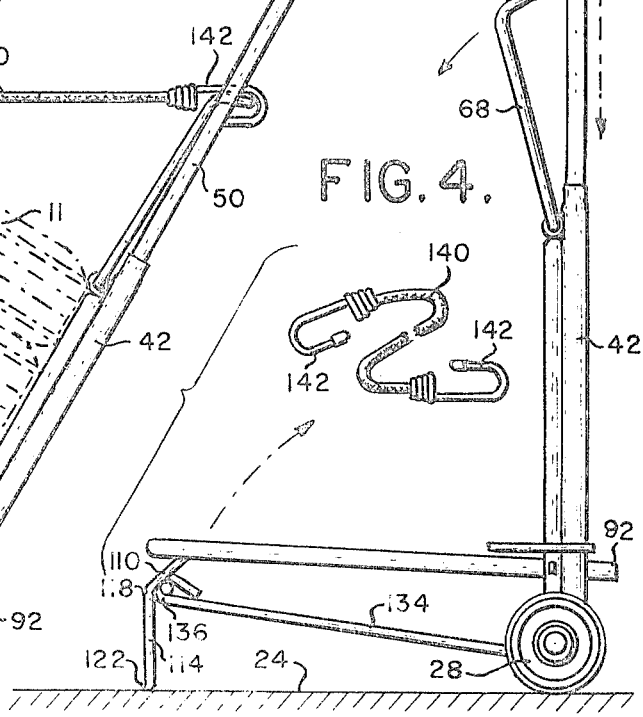
FIG. 4 is a diagrammatic side view of the collapsible carrier of FIG. 1.

The handle apparatus 20 also preferably includes a lock device 64 including a lock tube 66 affixed to the bottom hollow tubes 42 and 44 near the open top end 46. Here also, as in most of the connections between the tube members, any desired process such as, for example, welding may be used to join the tubes together. Two lock arm members 68 and 70 have first ends 72 and 74 rotatably received within the lock tube 66. The lock arm members extend from the ends 72 and 74 so that their second ends 76 and 78 are spaced from each other so as to forcibly fit between the telescoping tubes 50 and 52 when the telescoping tubes 50, 52, 56 and 58 are extended. In other words, the arm members 68 and 70 are bent near their ends 72 and 74 so as to converge towards each other until the distance between the outer most edges of the tubes is slightly more than the distance between the inner edges of the telescoping tubes 50 and 52 at the point where the lock arm members 68 and 70 intersect the latter tubes. A lock portion 80 and 82, as best seen in FIGS. 1 and 4, is affixed to and extends substantially 90° from the second ends 76 and 78, respectively, of the lock arm members. The lock portions are bent in the direction of the telescoping tubes 50 and 52 and forcibly fit between the telescoping tubes. By pushing them against the hollow tubes 42 and 44, they lock the tubes 50, 52, 56 and 58 in an extended position. A lock bar 84 is affixed between the lock portions 80 and 82 by any conventional means. In one form, the arm members 68 and 70, lock portions 80 and 82 and the lock bar 84 are integrally formed from a single piece of material. The lock bar 84 may be used to move the lock portions 80 and 82 to and from their locking position. Also, with the locking portions 80 and 82 in their locking position, the lock bar 84 serves to exert outward pressure against the locking portions 80 and 82. This outward pressure serves to insure the locked condition of the telescoping tubes 50 and 52.

The fold out platform device 18 includes a pivot element 86 between the two legs 14 and 15 of the support member 12. This pivot element may consist of a solid rod which is received within holes bored in the legs of the support member and held into the support member by flattening down the ends of the rod. A U-shaped platform member 88 has two ends 90 and 92 which can be seen in FIGS. 1, 4 and 6. The platform member 88 is pivotally connected near the ends 90 and 92 to the pivot element 86. Specifically, holes are provided in a hollow tube which comprises the platform member 88 and the pivot element 86 is loosely received therein. A stop bar 94 is affixed between the bottom hollow tubes 42 and 44 for engaging the platform member ends 90 and 92. This arrangement restricts the platform member 88 to fold out to a substantially perpendicular direction to the support member 12.

Guard structures 96 and 98 are preferably affixed to the stop bar 94 and extend over the wheels 26 and 28 to prevent the load from interfering with the rotation of the wheels 26, 28. The guard structures 96 and 98 are preferably comprised of extensions of the rod 94 which is used to form the stop bar. The extensions forming the guard structures 96 and 98 are bent at approximately the middle of the wheels 26 and 28 towards the direction in which the platform member 88 extends from the support member and thereafter are bent into a substantially U-shaped configuration whereby any load overhanging from the platform device 18 will not contact the surface of the wheels 26, 28.

A platform support structure 100 is preferably pivotally connected to the platform device 18 and supports the collapsible carrier 10 in an upright position when the platform member 88 is folded out as seen in FIG. 1. The platform support structure 100 includes a support bar 102 having two ends 104 and 106 (FIG. 2) which are pivotably received in the platform member 88. Two support sections 108 and 110 (FIGS. 1 and 4) are connected to the two ends 104 and 106, respectively, and provide support for the platform member 88 when it is in a folded out position as illustrated in FIGS. 1 and 4. Two feet members 112 and 114 are connected at a first end 116 and 118, respectively, of the support section and are bent at an angle so that a second end 120 and 122 rest on the travel surface 24 to support the carrier when it is in an upright position. An adjoining base rod 124 is connected to the two ends of the feet members for providing a broad stabilizing base for the carrier when it is in an upright standing position. The base rod 124 may be bent at 126 so as to provide two separate base portions.

A folding apparatus 130 is connected to the platform support structure 100 and the wheel device 22 to draw the platform support structure 100 to rest against the support member 12 whenever the platform member 88 is folded against the support member and to fold out the platform member when the carrier is in an upright position as illustrated in FIG. 1. The folding apparatus 130 includes a rod element 132 which is affixed between the support sections 108 and 110. An operating rod 134 has a first end 136 pivotally received on the rod element 132. The end 136 may be bent around the rod element as best seen in FIG. 4 and held into place by two protrusions 138 located on the rod 132. A second end 139 of the operating rod 134 is pivotally connected to the axle 38 which is a portion of the wheel device 22. The end 139 may be held in place by protrusions 138 similar to those used on the rod element 132.

Figure 3:
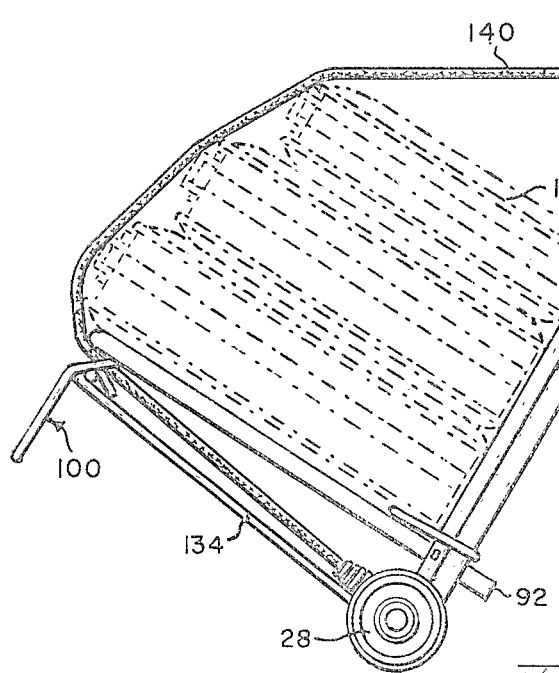
FIG. 3 is a side view of the collapsible carrier of FIG. 1 transporting a load of luggage.

An elastic band 140 (see FIG. 4) of a conventional type having two hook-shaped end members 142 may be used to fix the load onto the carrier as illustrated in FIG. 3. Alternatively, the elastic band may be used to keep the carrier in a compact folded position as illustrated in FIGS. 5 and 6.

The collapsible carrier is made of a lightweight steel that is chrome plated for longer wear. However, it is within the scope of the present invention to use any desired material such as, for example, plastic or aluminum.

Figure 5:
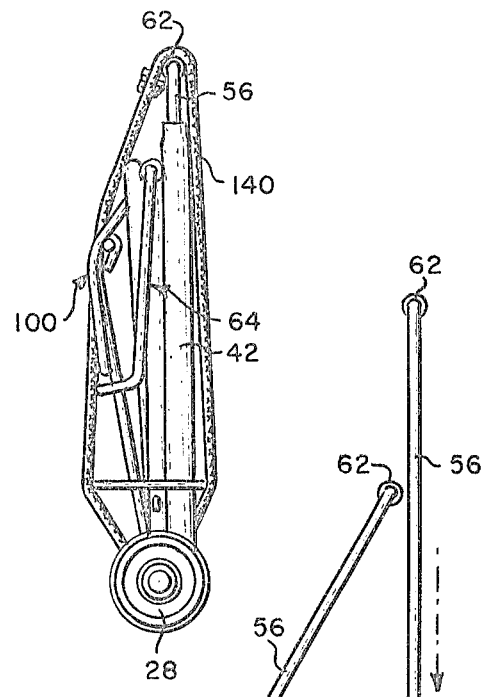
FIG. 5 is a side view of the collapsible carrier of FIG. 1 in a closed position.

In use, the collapsible carrier 10 may be stored or carried in a folded position as illustrated in FIGS. 5 and 6. At this time, it is in its most compact configuration and it can be maintained as such with the elastic band 140 as shown. When it is desired to open the carrier, the elastic band 140 is removed and the fold out platform device 18 will drop down from its position against the support member 12 so that the platform member 88 is in a substantially parallel direction to the travel surface or ground 24. As the platform member 88 pivots on the pivot element 86, the operating rod 134 will concurrently pivot on the axle 38 and on the rod element 132 to cause the platform support structure 100 to unfold and assume a position to provide a stabilizing base for the carrier when it is in the upright position. The platform member 88 is limited in its movement by its ends 90 and 92. Which contact the stop bar 94 to prevent any further movement of the platform member 88. After the carrier is standing in an open, upright position, the telescoping tubes 50, 52, 56 and 58 may be drawn out of the bottom hollow tubes 42 and 44 (see FIG. 4) and the lock arm members 68 and 70 may be pushed between the tubes 50 and 52. The lock portion 80 and 82 forces the tubes apart so that they enter the open ends 46 at an angle which prevents the tubes 50 and 52 from sliding into the bottom hollow tubes 42 and 44. In addition, when the lock portions 80 and 82 are pressed against the tubes 50 and 52, the upper telescoping tubes 56 and 58 also assume an angle with respect to the top ends of the tubes 50 and 52 whereby the tubes 56 and 58 cannot drop into the lower receiving tubes 50 and 52.

Now the collapsible carrier is in its fully extended upright position and it may be loaded with any desired material such as, for example, the suitcases 11 shown in FIG 3. Then, the elastic band 140 may be securely wrapped around the suitcases and connected by the end members 142 to a portion of the carrier as shown.

When the carrier is moved across a travel surface such as 24, the wheels 26, 28 will normally have a minimum surface area 32 contacting the travel surface 24 along which the load is transported. In particular, the wheels 26 and 28 contact the travel surface along the narrow central section 32. Since such a small portion of the wheel 26, 28 is actually contacting the travel surface 24, the rolling friction against the travel surface will be minimized. If the carrier is unevenly loaded with more weight over one wheel 26, 28 than the other, or if the carrier is pulled over rough or uneven terrain which raises one wheel to a higher level than the other wheel, or if the carrier is tilted to one side accidentally by the person pulling it, such as due to the imbalance created by one of the abovedescribed conditions, or any other situation, rolling surfaces 23 or 25 of the wheels 26, 28 will immediately contact surface 24 to provide stability and support for the carrier and facilitate the carrier rolling straight while decreasing the tendency and/or preventing the carrier from laterally tipping over in a variety of different situations.

Some additional features on the carrier are the support sections 108 and 110 on the platform support structure 100 which rest against the bottom of the U-shaped platform member 88 to increase its stability in the event that a heavy load is placed upon the platform member. Also, the guard structures 96 and 98 prevent any luggage which may be overhanging from the platform member 88 to contact the wheels 26 and 28 and thereby prevent their movement.

When it is desired to fold the collapsible carrier 10 back into its most compact position, the lock bar 84 is first pulled to move the lock portions 80 and 82 from between the telescoping tubes 50 and 52. Then the tubes 58, 56, 52 and 50 may be dropped into the bottom hollow tubes 42 and 44. Next, the platform member 88 is raised to rest against the support member 12 and the platform support structure 100 is pulled back against the bottom of the platform member by operating rod 134 (as previously explained). Then the lock arm member 68 may be further pushed down to rest against the platform member 88 as seen in FIG. 6. Finally, the elastic band may be wrapped around the collapsible carrier as shown in FIG. 6.

One skilled in the art will realize that there has been disclosed a collapsible carrier which is stable under both heavy load conditions, and when operated on uneven travel surfaces. The carrier is sturdily constructed, compact and easy to fold out for operation. Further, it is relatively simple and therefore inexpensive to manufacture.

While there has been described what is at present considered a preferred embodiment of the invention, it will be obvious to one skilled in the art that various changes and modifications may be made therein without departing from the invention and it is, therefore, aimed in the appended claims to cover all such changes and modifications as followed in the true spirit and scope of the invention.

What is claimed is:

1. In a collapsible carrier for transporting loads comprising a support member having two legs and an adjoining cross arm, fold out platform means pivotably connected to said support member for holding said loads, and telescoping handle means affixed to said support member for moving said carrier, the improvement comprising wheel means adjoined to said handle means, said wheel means including an axle fixedly adjoined to said handle means and a pair of spaced apart cylindrical-like wheels slidingly and rotatably received on said axle between said handle means and the ends of said axle, each of said wheels having two outer edges of a first diameter, a narrow central section located between the outer edges and having a second diameter larger than said first diameter for enabling the wheel to contact a travel surface along which the load is transported along said narrow central section, two conical-like sections located between said central section and said outer edges having a diameter greater than said first diameter and less than said second diameter, said conical-like sections being symmetrical to each other and having a tapered outer surface forming an acute angle with said travel surface sufficiently small to enable solely said narrow central section to contact said travel surface when said carrier is rollling upright for minimizing rolling friction against said travel surface while enabling a corresponding one of said conical-like section tapered outer surfaces to contact said travel surface to support said carrier and enable rolling of said wheel therealong when said carrier is laterally tipped for facilitating said carrier rolling straight while decreasing the tendency of said carrier to laterally tip over under adverse conditions as said carrier is rolled along said travel surface by said wheels, said telescoping handle means including two bottom hollow tubes each affixed along the length of a different leg of the support member and having open top and bottom ends, each of said bottom hollow tubes receiving first telescoping tubes in said top ends and having a stop member in said bottom ends to retain said first tubes in said bottom tubes, said handle means further including a pivotally mounted lock bar means for locking said telescoping tubes in an extended position thereof, said lock bar means being pivotally mounted to said bottom hollow tubes for pivoting between an unlocked position for enabling said carrier to be collapsed and a locked position for locking said telescoping tubes in said extended position thereof with said carrier in an open upright position thereof, said pivoting lock bar means being transversely insertable between said first telescoping tubes in said locked position when said tubes are in said extended position and being of sufficient transverse extent for forcing said first telescoping tubes further apart from each other a sufficient distance to angulate said first telescoping tubes with respect to said bottom hollow tubes for preventing further telescoping movement of said first telescoping tubes within said bottom hollow tubes, said pivoting lock bar means being removably retainable in said locked position, whereby a stable carrier is provided in said locked position, said telescoping movement being enabled in said unlocked position.

2. An improved collapsible carrier in accordance with claim 1 wherein said acute angle is substantially in the range of between 10 and 15 degrees.

3. An improved collapsible carrier in accordance with claim 1 wherein said tapered outer surfaces are curved.

4. An improved collapsible carrier in accordance with claim 1 wherein said lock bar means includes a lock means for locking said telescoping tubes when said telescoping tubes are extended, said lock means includes a lock arm member having first ends rotatably received within said tube affixed to the bottom hollow tubes near the top end, two lock arm members have first ends rotatably received within said lock tube and extending from said lock tube so that their second ends are spaced to forcibly fit between said first telescoping tubes when said first telescoping tubes are extended, a lock portion affixed to and extending substantially perpendicular to the second ends of said lock arm members in the direction of said first telescoping tubes for forcibly fitting between said first telescoping tubes and pushing them against said hollow tubes to lock said first telescoping tubes in said extended position, and a lock bar affixed between said lock portions for exerting outward pressure against said lock portions to maintain their forced fit between said first telescoping tubes.

5. An improved collapsible carrier in accordance with claim 1 wherein said fold out platform means includes a pivot element between said two legs of said support member, a U-shaped platform member having two ends and being pivotably connected near said ends to said pivot element, and a stop bar affixed between said bottom hollow tubes for engaging said two platform member ends to restrict the platform member to fold out substantially perpendicular to said support member.

6. An improved collapsible carrier in accordance with claim 5 wherein guard means are affixed to said stop bar and extend over said wheel means to prevent the load from interfering with said wheel means.

7. An improved collapsible carrier in accordance with claim 6 wherein a platform support means is pivotally connected to said platform means for supporting the collapsible carrier in an upright position when said platform member is folded out.

8. An improved collapsible carrier in accordance with claim 6 wherein said platform support means includes a support bar having two ends pivotably received in said platform member, two support sections connected to said two ends for supporting said platform member when it is in a folded out position, two feet members being connected at a first end to said support sections and bent at an angle so that a second end rests on the travel surface to support the carrier when it is in said upright position and an adjoining base rod connected to the two ends of the foot members for stabilizing the carrier when it is standing upright.

9. An improved collapsible carrier in accordance with claim 8 wherein a folding means is connected to said platform support means and said wheel means draws said platform support means to rest against said support member whenever said platform member is folded against said support member and folds out said platform member when the carrier is in an upright position.

10. An improved collapsible carrier in accordance with claim 9 wherein said folding means includes a rod element affixed between said support sections, an operating rod having a first end pivotally received on said rod element and a second end pivotally connected to said wheel means.

11. An improved collapsible carrier in accordance with claim 10 wherein said wheel means includes an axle adjoined to said telescoping handle means; said axle pivotally receiving said second end of said rod element.

12. An improved collapsible carrier in accordance with claim 1 wherein said telescoping handle means further includes second telescoping tubes each receivable in said first telescoping tubes, said second telescoping tubes being joined at one end to form a transverse handle member, said lock bar means being of sufficient transverse extent for forcing said second telescoping tubes further apart from each other a sufficient distance to angulate said second telescoping tubes with respect to said first telescoping tubes for preventing further telescoping movement of said second telescoping tubes within said first telescoping tubes, whereby said locked position of said lock bar means between said first telescoping tubes prevents telescoping movement of both said first and second telescoping tubes.

13. In a collapsible carrier for transporting loads comprising a support member having two legs and an adjoining cross arm, fold out platform means pivotably connected to said support member for holding said loads, and telescoping handle means affixed to said support member for moving said carrier, the improvement comprising wheel means adjoined to said handle means, said wheel means including an axle fixedly adjoined to said handle means and a pair of spaced apart cylindrical-like wheels slidingly and rotatably received on said axle between said handle means and the ends of said axle, each of said wheels having two outer edges of a first diameter, a narrow central section located between the outer edges and having a second diameter larger than said first diameter for enabling the wheel to contact a travel surface along which the load is transported along said narrow central sectin, two conical-like sections located between said central section and said outer edges having a diameter greater than said first diameter and less than said second diameter, said conical-like sections being symmetrical to each other and abutting directly against the sidewalls of said central section at opposite ends thereof and having a tapered outer surface forming an acute angle with said travel surface sufficiently small to enable solely said narrow central section to contact said travel surface when said carrier is rolling upright for minimizing rolling friction against said travel surface while enabling a corresponding one of said conical-like section tapered outer surfaces to contact said travel surface to support said carrier and enable rolling of said wheel therealong when said carrier is laterally tipped for facilitating said carrier rolling straight while decreasing the tendency of said carrier to laterally tip over under adverse conditions as said carrier is rolled along said travel surface by said wheels.

* * * * *

UNITED STATES PATENT AND TRADEMARK OFFICE
CERTIFICATE OF CORRECTION

PATENT NO. : 4,248,453
DATED : February 3, 1981

INVENTOR(S) : Ted Stark

It is certified that error appears in the above—identified patent and that said Letters Patent is hereby corrected as shown below:

Column 3, line 4: "48" should read -- 58 --.

Signed and Sealed this

Fourteenth Day of July 1981

[SEAL]

Attest:

Attesting Officer

GERALD J. MOSSINGHOFF

Commissioner of Patents and Trademarks